(12) United States Patent
Huck (10) Patent No.: US 7,976,283 B2
(45) Date of Patent: Jul. 12, 2011

(54) NOISE REDUCER FOR ROTOR BLADE IN WIND TURBINE

(75) Inventor: Robert Karl Huck, Greenville, SC (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 12/943,135

(22) Filed: Nov. 10, 2010

(65) Prior Publication Data

US 2011/0142665 A1    Jun. 16, 2011

(51) Int. Cl.
*F03D 3/06* (2006.01)

(52) U.S. Cl. ............... 416/228; 415/119; 416/236 R; 416/237; 416/240

(58) Field of Classification Search .......... 415/119; 416/62, 132 A, 132 B, 228, 235, 236 R, 236 A, 416/237, 240
See application file for complete search history.

(56) References Cited

U.S. PATENT DOCUMENTS

| | | | | |
|---|---|---|---|---|
| 573,562 | A | * | 12/1896 | Wittram ............. 416/235 |
| 1,861,065 | A | * | 5/1932 | Poot ................ 416/235 |
| 2,238,749 | A | * | 4/1941 | Peltier ............. 415/119 |
| D131,271 | S | * | 2/1942 | Colura ............. 416/228 |
| 2,899,128 | A | * | 8/1959 | Vaghi .............. 415/119 |
| 5,088,665 | A | | 2/1992 | Vijgen et al. |
| 5,533,865 | A | | 7/1996 | Dassen et al. |
| 6,729,846 | B1 | | 5/2004 | Wobben |
| 6,830,436 | B2 | | 12/2004 | Shibata et al. |
| 7,059,833 | B2 | | 6/2006 | Stiesdal et al. |
| 7,413,408 | B1 | * | 8/2008 | Tafoya ............. 416/228 |
| 7,637,721 | B2 | | 12/2009 | Driver et al. |
| 2007/0065290 | A1 | | 3/2007 | Herr |
| 2007/0077150 | A1 | | 4/2007 | Llorente Gonzalez |
| 2008/0061192 | A1 | | 3/2008 | Sullivan |
| 2008/0080977 | A1 | | 4/2008 | Bonnet |
| 2008/0166241 | A1 | | 7/2008 | Herr et al. |
| 2008/0187442 | A1 | | 8/2008 | Standish et al. |
| 2009/0016891 | A1 | | 1/2009 | Parsania et al. |
| 2009/0074585 | A1 | | 3/2009 | Koegler et al. |
| 2010/0329879 | A1 | * | 12/2010 | Presz et al. ........ 416/228 |

FOREIGN PATENT DOCUMENTS

| | | |
|---|---|---|
| EP | 2028366 | 2/2009 |
| EP | 2053240 | 4/2009 |
| JP | 2000120524 | 4/2000 |
| JP | 2003254225 | 9/2003 |
| WO | WO2008035149 | 3/2008 |
| WO | WO2008/113349 | 9/2008 |
| WO | WO2009/025549 | 2/2009 |

\* cited by examiner

*Primary Examiner* — Christopher Verdier
(74) *Attorney, Agent, or Firm* — Dority & Manning, P.A.

(57) ABSTRACT

A rotor blade assembly for a wind turbine is disclosed. The rotor blade assembly includes a rotor blade having surfaces defining a pressure side, a suction side, a leading edge, and a trailing edge extending between a tip and a root. The rotor blade assembly further includes a noise reducer configured on a surface of the rotor blade. The noise reducer includes a plurality of reinforcing members and a plurality of noise reduction features. Each of the plurality of reinforcing members extends outwardly with respect to the rotor blade. Each of the plurality of noise reduction features is connected to one of the plurality of reinforcing members and defines a width. Each of the plurality of reinforcing members causes the connected noise reduction feature to have a variable stiffness throughout at least a portion of the width of the connected noise reduction feature.

20 Claims, 7 Drawing Sheets

NOISE REDUCER FOR ROTOR BLADE IN WIND TURBINE

FIELD OF THE INVENTION

The present disclosure relates in general to wind turbine rotor blades, and more particularly to noise reducers configured on the rotor blades.

BACKGROUND OF THE INVENTION

Wind power is considered one of the cleanest, most environmentally friendly energy sources presently available, and wind turbines have gained increased attention in this regard. A modern wind turbine typically includes a tower, generator, gearbox, nacelle, and one or more rotor blades. The rotor blades capture kinetic energy of wind using known foil principles. The rotor blades transmit the kinetic energy in the form of rotational energy so as to turn a shaft coupling the rotor blades to a gearbox, or if a gearbox is not used, directly to the generator. The generator then converts the mechanical energy to electrical energy that may be deployed to a utility grid.

In many cases, various components are attached to the rotor blades of wind turbines to perform various functions during operation of the wind turbines. These components may frequently be attached adjacent the trailing edges of the rotor blades. For example, noise reducers may be attached adjacent the trailing edges of the rotor blades to reduce the noise and increase the efficiency associated with the rotor blades. However, typical prior art noise reducers have a variety of disadvantages, and may not adequately reduce the noise associated with typical rotor blades. For example, many currently know noise reducers include a plurality of serrations. However, each serration may have a constant stiffness throughout the width of the serration. This constant stiffness may not allow the serration to adequately flex in response to wind flow over the noise reducer. Thus, the noise reduction characteristics of these prior art noise reducers may be impeded.

Thus, an improved noise reducer for a rotor blade would be desired. For example, a noise reducer with improved noise reduction features would be advantageous. Specifically, a noise reducer with noise reduction features that have improved responses to wind flow over the noise reducer would be desired.

BRIEF DESCRIPTION OF THE INVENTION

Aspects and advantages of the invention will be set forth in part in the following description, or may be obvious from the description, or may be learned through practice of the invention.

In one embodiment, a rotor blade assembly for a wind turbine is disclosed. The rotor blade assembly includes a rotor blade having surfaces defining a pressure side, a suction side, a leading edge, and a trailing edge extending between a tip and a root. The rotor blade assembly further includes a noise reducer configured on a surface of the rotor blade. The noise reducer includes a plurality of reinforcing members and a plurality of noise reduction features. Each of the plurality of reinforcing members extends outwardly with respect to the rotor blade. Each of the plurality of noise reduction features is connected to one of the plurality of reinforcing members and defines a width. Each of the plurality of reinforcing members causes the connected noise reduction feature to have a variable stiffness throughout at least a portion of the width of the connected noise reduction feature.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Figure 1:
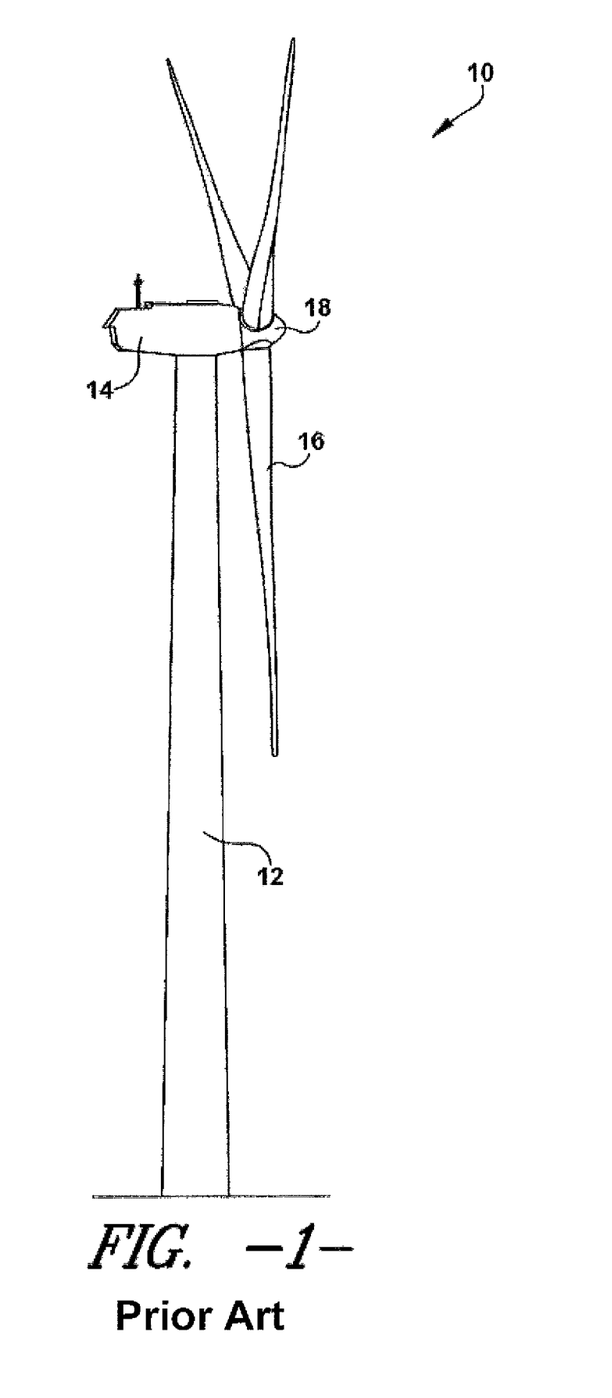
FIG. 1 is a perspective view of one embodiment of a prior art wind turbine of the present disclosure.

FIG. 1 illustrates a wind turbine 10 of conventional construction. The wind turbine 10 includes a tower 12 with a nacelle 14 mounted thereon. A plurality of rotor blades 16 are mounted to a rotor hub 18, which is in turn connected to a main flange that turns a main rotor shaft. The wind turbine power generation and control components are housed within the nacelle 14. The view of FIG. 1 is provided for illustrative purposes only to place the present invention in an exemplary field of use. It should be appreciated that the invention is not limited to any particular type of wind turbine configuration.

Figure 2:
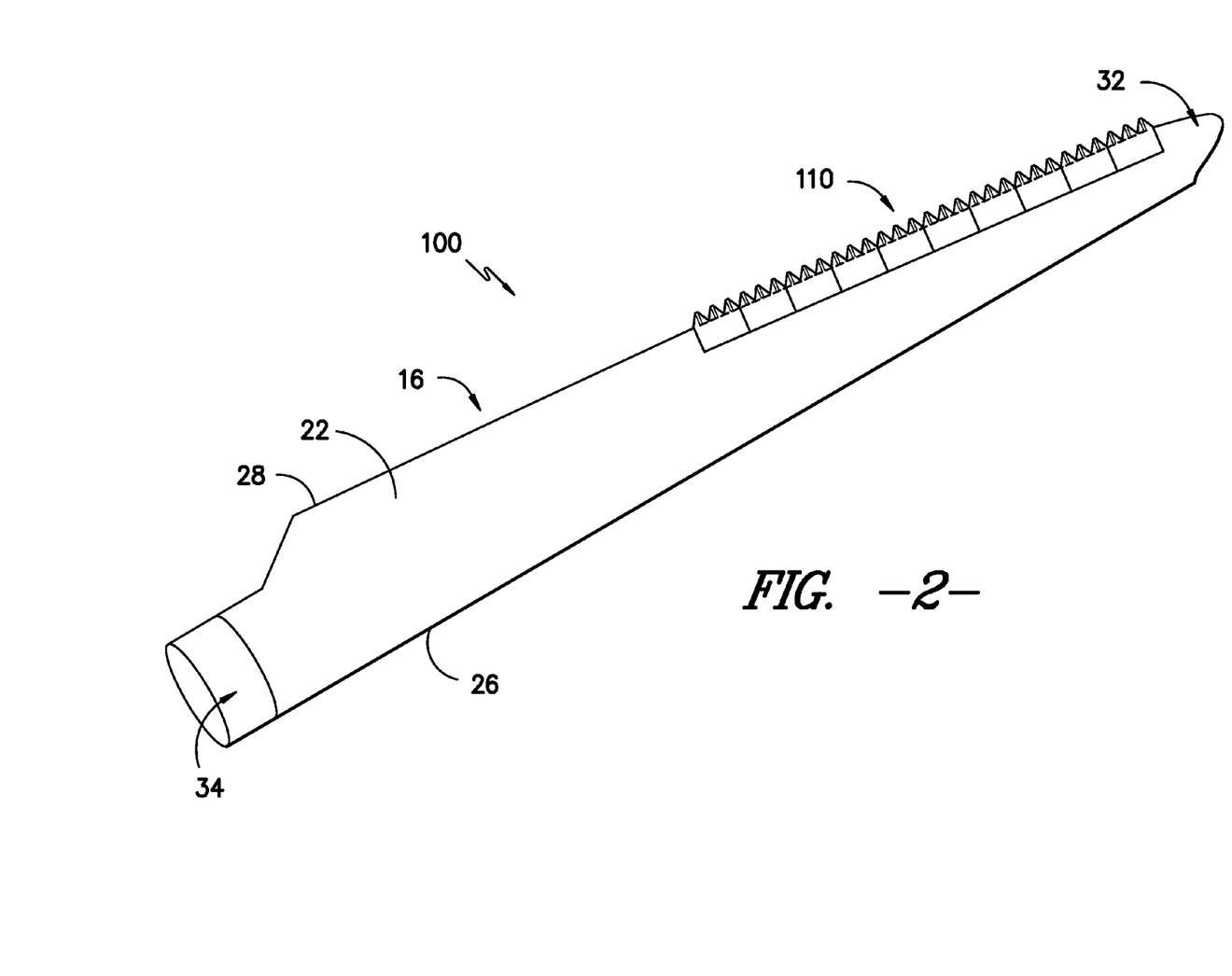
FIG. 2 is a perspective view of one embodiment of a rotor blade assembly of the present disclosure.

Referring to FIG. 2, a rotor blade 16 according to the present disclosure may include surfaces defining a pressure side 22 and a suction side 24 (see FIGS. 3 through 11) extending between a leading edge 26 and a trailing edge 28, and may extend from a blade tip 32 to a blade root 34.

In some embodiments, the rotor blade 16 may include a plurality of individual blade segments aligned in an end-to-end order from the blade tip 32 to the blade root 34. Each of the individual blade segments may be uniquely configured so that the plurality of blade segments define a complete rotor blade 16 having a designed aerodynamic profile, length, and other desired characteristics. For example, each of the blade segments may have an aerodynamic profile that corresponds to the aerodynamic profile of adjacent blade segments. Thus, the aerodynamic profiles of the blade segments may form a continuous aerodynamic profile of the rotor blade 16. Alternatively, the rotor blade 16 may be formed as a singular, unitary blade having the designed aerodynamic profile, length, and other desired characteristics.

The rotor blade 16 may, in exemplary embodiments, be curved. Curving of the rotor blade 16 may entail bending the rotor blade 16 in a generally flapwise direction and/or in a generally edgewise direction. The flapwise direction may generally be construed as the direction (or the opposite direction) in which the aerodynamic lift acts on the rotor blade 16. The edgewise direction is generally perpendicular to the flapwise direction. Flapwise curvature of the rotor blade 16 is also known as pre-bend, while edgewise curvature is also known as sweep. Thus, a curved rotor blade 16 may be pre-bent and/or swept. Curving may enable the rotor blade 16 to better withstand flapwise and edgewise loads during operation of the wind turbine 10, and may further provide clearance for the rotor blade 16 from the tower 12 during operation of the wind turbine 10.

As illustrated in FIGS. 2 through 11, the present disclosure may further be directed to a rotor blade assembly 100. The rotor blade assembly 100 may include a noise reducer 110 and a rotor blade 16. In general, the noise reducer 110 may be configured on a surface of the rotor blade 16, and may reduce the aerodynamic noise being emitted from the rotor blade 16 during operation of the wind turbine 10 and/or increase the efficiency of the rotor blade 16. In an exemplary embodiment of the present disclosure, the noise reducer 110 may be configured on a surface of the rotor blade 16 adjacent the trailing edge 28 of the rotor blade 16. Alternatively, the noise reducer 110 may be configured on a surface of the rotor blade 16 adjacent the leading edge 26 of the rotor blade 16, or adjacent the tip 32 or the root 34 of the rotor blade 16, or at any other suitable position on the rotor blade 16.

In exemplary embodiments, as shown in FIGS. 2 through 8, the noise reducer 110 may configured on, such as mounted to, the pressure side 22 of the rotor blade 16. In alternative embodiments, the noise reducer 110 may be configured on, such as mounted to, the suction side 24. In yet other alternative embodiments, the noise reducer 110 may be configured on the rotor blade 16 between the pressure side 22 and the suction side 24.

Figure 9:
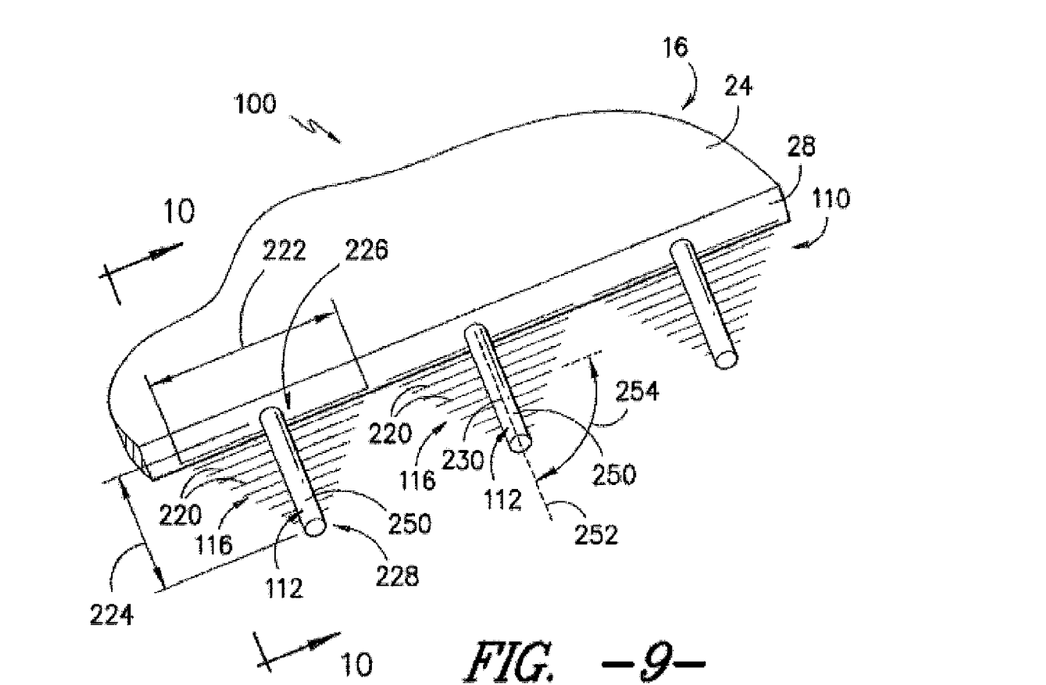
FIG. 9 is a perspective view of another embodiment of a noise reducer of the present disclosure.
Figure 10:
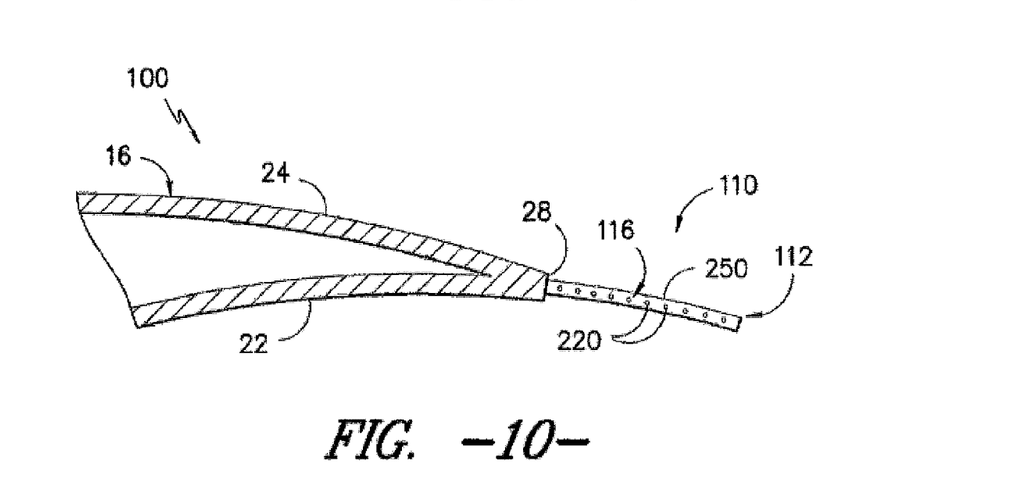
FIG. 10 is a cross-sectional view, through the lines 10-10 of FIG. 9, of one embodiment of a noise reducer of the present disclosure; and, FIG. 11 is a perspective view of another embodiment of a noise reducer of the present disclosure.
Figure 11:
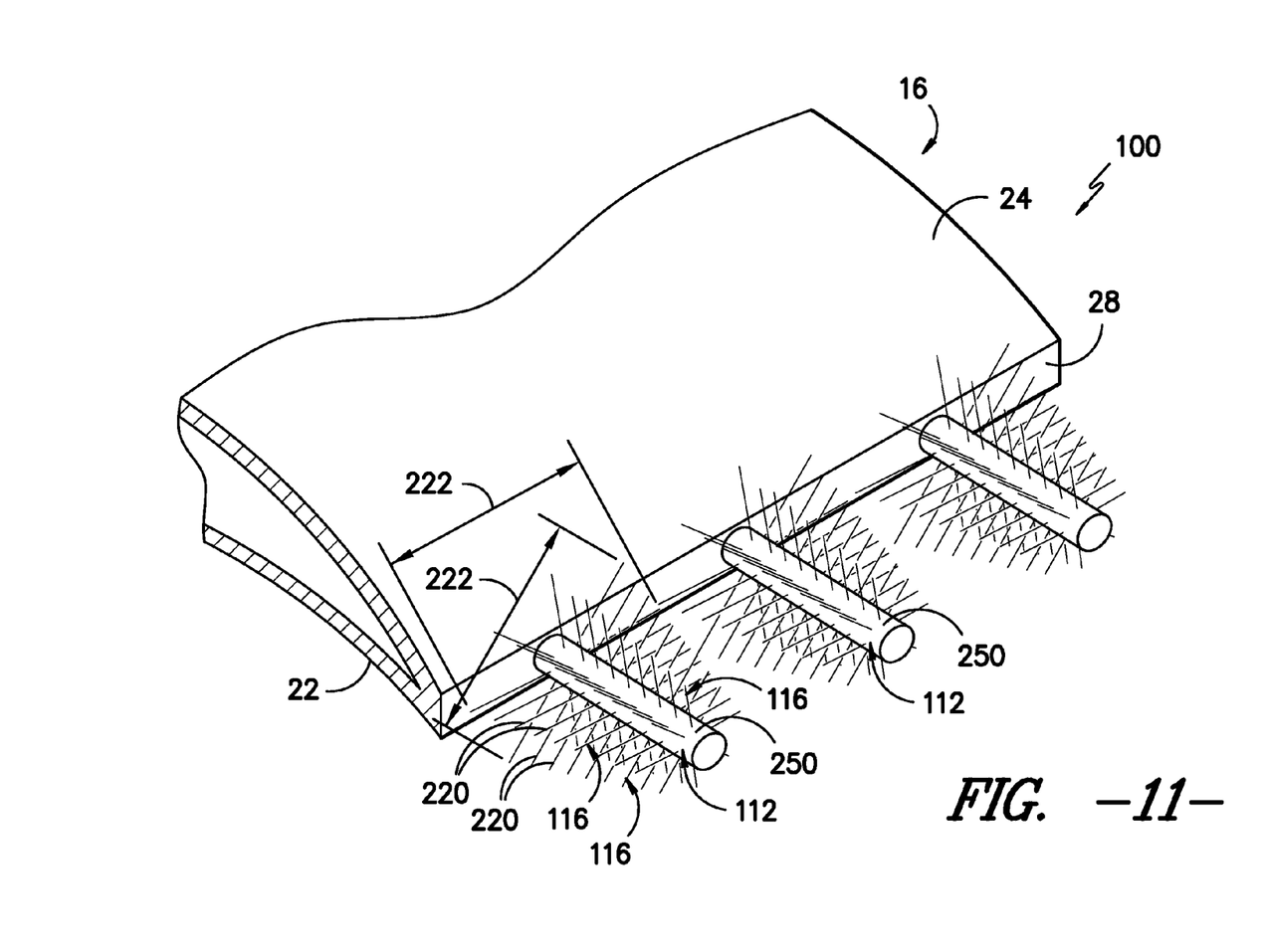

As shown in FIGS. 9 through 11, for example, the noise reducer 110 may be configured on the trailing edge 28 between the pressure side 22 and the suction side 24. In this embodiment, the rotor blade 16 may be formed from one or more shell portions. For example, one shell portion may include the pressure side 22 and extend between the leading edge 26 and the trailing edge 28, while another shell portion may include the suction side 24 and extend between the leading edge 26 and the trailing edge 28. The noise reducer 110 may be mounted between these shell portions such that a portion of the noise reducer 110 is disposed in the interior of the rotor blade 16, while another portion extends from the rotor blade 16. Alternatively, the noise reducer 110 may extend through a shell portion of the rotor blade 16 at a desired location, such as at the trailing edge 28. In further alternative embodiments, the noise reducer 110 may be mounted directly to the exterior of the rotor blade 16 between the pressure side 22 and the suction side 24 through the use of, for example, a suitable adhesive or suitable mechanical fasteners. For example, in exemplary embodiments, the noise reducer 110 may be mounted directly to the trailing edge 28.

As shown in FIGS. 2 through 11, the noise reducer 110 of the present disclosure includes a plurality of reinforcing members 112. In general, the reinforcing members 112 extending outwardly from the rotor blade 16. For example, in embodiments wherein the noise reducer 110 is configured on a surface of the rotor blade 16 adjacent the trailing edge 28, each reinforcing member 112 may extend in a generally outward direction from the trailing edge 28. In some embodiments, each reinforcing member 112 may be generally perpendicular to the trailing edge 28 at the location of the reinforcing member 112. However, it should be understood that the present disclosure is not limited to generally perpendicular reinforcing members 112, and rather that any reinforcing member 112 extending in any generally outward direction from a rotor blade 16 is within the scope and spirit of the present disclosure.

Figure 4:
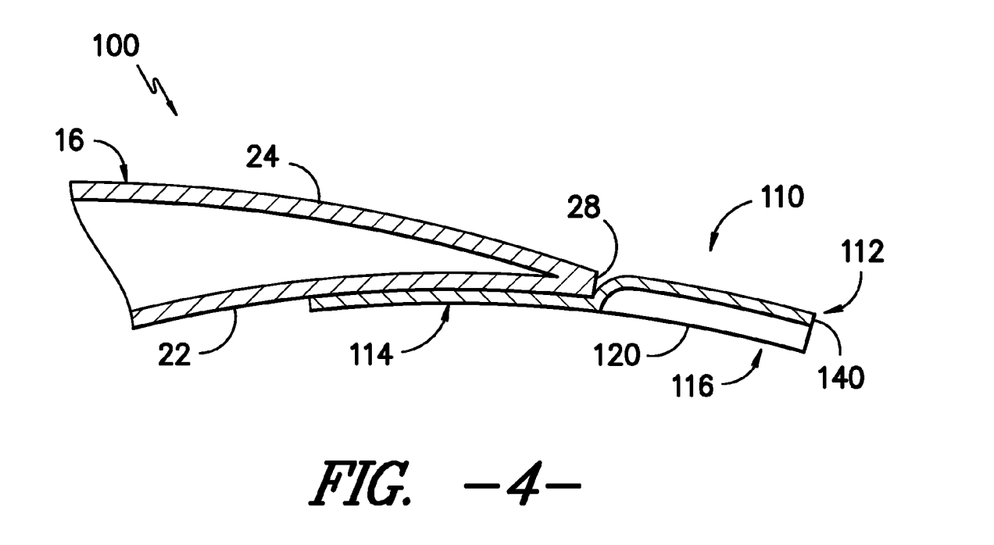
FIG. 4 is a cross-sectional view, through the lines 4-4 of FIG. 3, of one embodiment of a noise reducer of the present disclosure.

In some embodiments, as shown in FIGS. 2 and 4, the noise reducer 110 may include a base plate 114. In these embodiments, the base plate 114 may generally be that portion of the noise reducer 110 that is mounted to the rotor blade 16 to configure the noise reducer 110 on a surface of the rotor blade 16. Alternatively, the reinforcing members 112 may be mounted directly to the rotor blade 16, as shown in FIGS. 9 through 11, or may be an integral part of the rotor blade 16. For example, in some embodiments wherein the noise reducer 110 is mounted adjacent the trailing edge 28, the reinforcing members 112 may extend directly from the trailing edge 28.

The noise reducer 110 may, in some embodiments, be formed from a plurality of noise reducer sections. Each section may include one or more reinforcing members 112, and each section may further include a base plate portion. Alternatively, the noise reducer 110 may be a singular, unitary component.

As shown, the noise reducer 110 of the present disclosure further includes a plurality of noise reduction features 116. In general, the noise reduction features 116 may interact with the wind flow past the noise reducer 110 when the rotor blade assembly 100 is in operation, and may interact with the wind flow to reduce the noise associated with the rotor blade 16. As shown in FIGS. 2 through 11, each of the plurality of noise reduction features 116 may be connected to one of the plurality of reinforcing members 112. For example, in some embodiments as discussed below, the noise reduction features 116 may be mounted on or attached to the reinforcing members 112. In other embodiments, a connected reinforcing member 112 and noise reduction feature 116 may be integral unit.

As discussed below, each of the reinforcing members 112 may cause the connected noise reduction feature 116 to have a variable stiffness throughout at least a portion of the noise reduction feature 116. In particular, the reinforcing members 112 may cause the stiffness in the noise reduction features 116 to vary in a generally width-wise direction. For example, each noise reduction feature 116 may extend outwardly from the connected reinforcing member 112, such as generally laterally from the body of the reinforcing member 112, defining a width of the noise reduction feature. Each noise reduction feature 116 may thus generally have a greater stiffness along the width at locations proximate to the reinforcing member 112, and may have a lesser stiffness along the width at locations distant from the reinforcing member 112. During operation of the rotor blade assembly 100, the noise reduction feature 116 may thus have a variable flex throughout at least a portion of the width of the noise reduction feature 116 when interacting with the wind flow. This variable flex due to the variable stiffness throughout at least a portion of the width may improve the performance of the noise reduction feature 116, and thus the noise reducer 110, in reducing the noise associated with the rotor blade 16.

In some exemplary embodiments, as shown in FIGS. 2 through 8, each or at least a portion of the noise reduction features 116 comprises a serration 120. While in exemplary embodiments the serrations 120 are generally V-shaped, in alternative embodiments the serrations 120 may be U-shaped, or may have any other shape or configuration suitable for reducing the noise being emitted from the rotor blade 16 during operation of the wind turbine 10.

Figure 3:
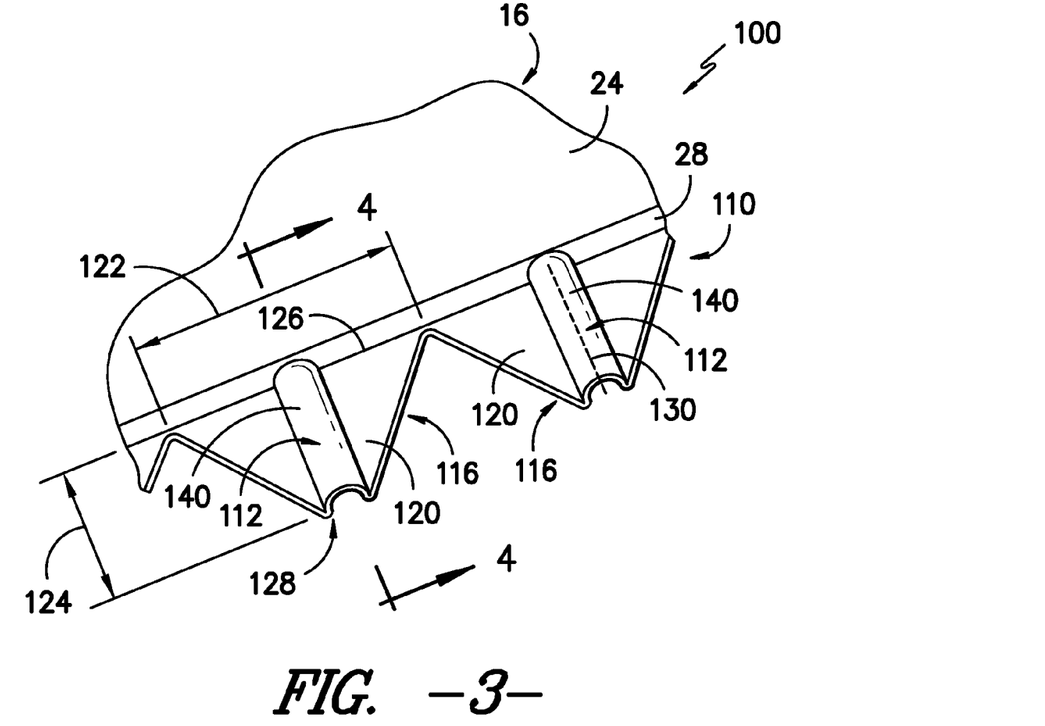
FIG. 3 is a perspective view of one embodiment of a noise reducer of the present disclosure.
Figure 5:
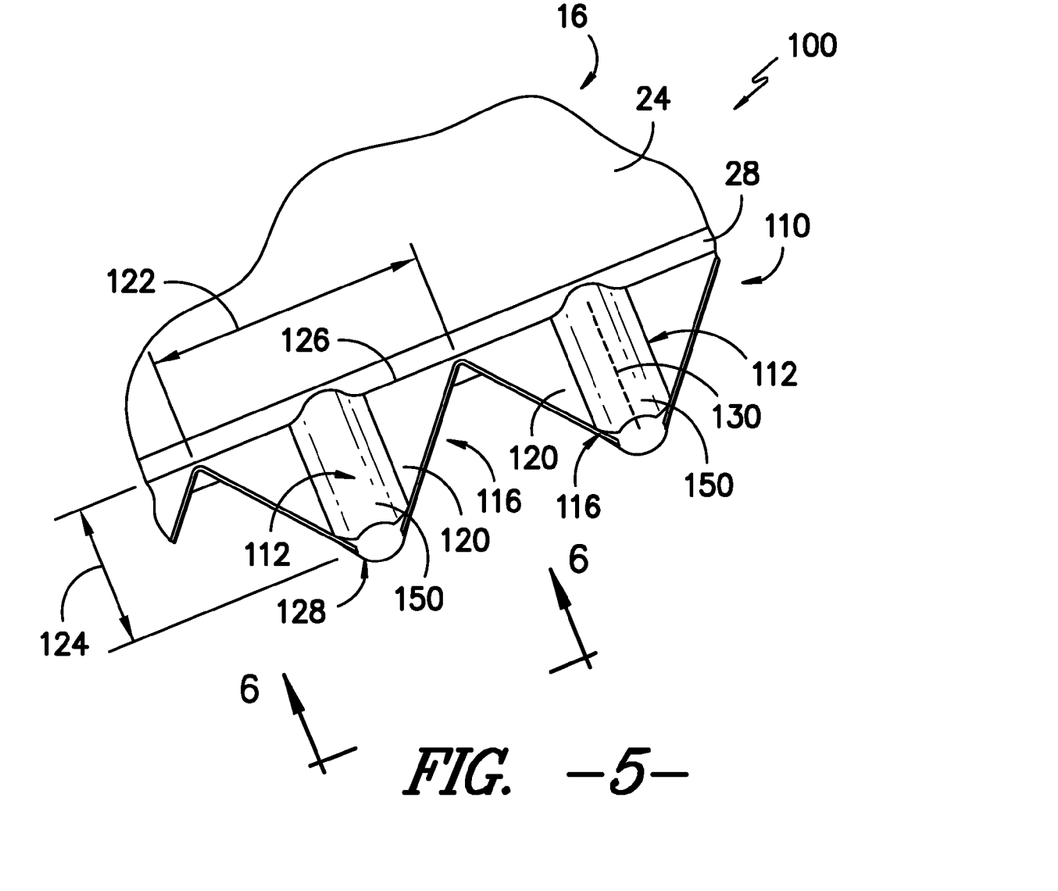
FIG. 5 is a perspective view of another embodiment of a noise reducer of the present disclosure.
Figure 7:
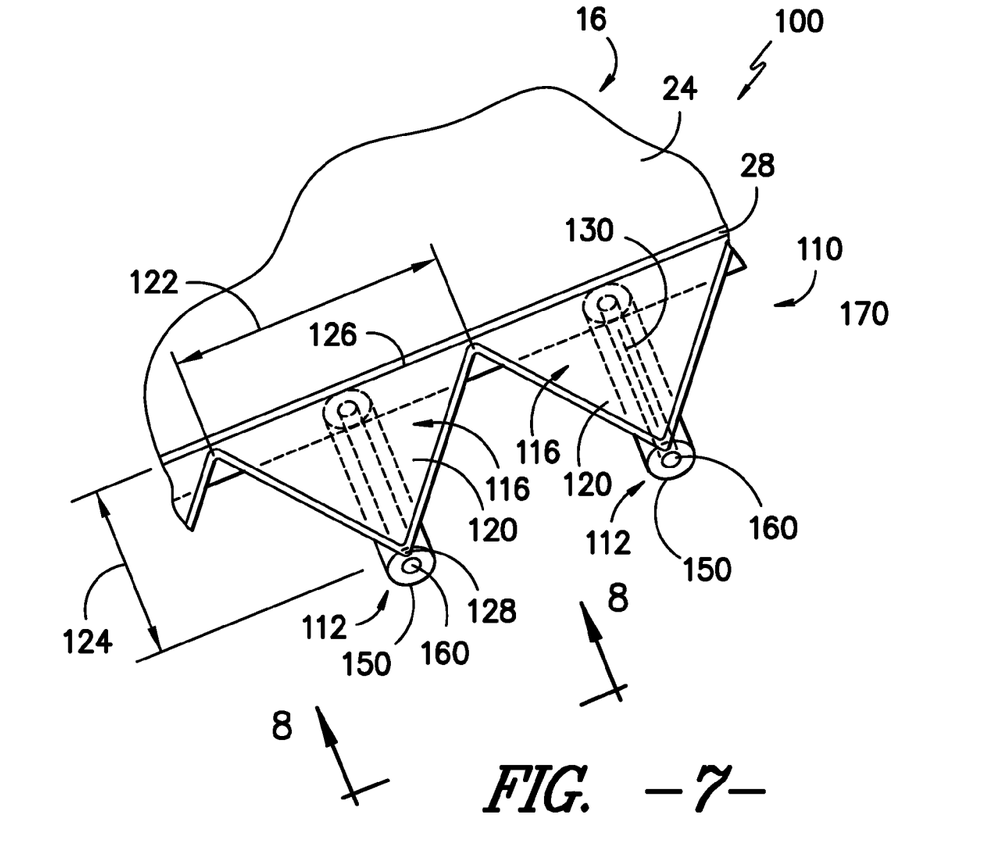
FIG. 7 is a perspective view of another embodiment of a noise reducer of the present disclosure.

As shown in FIGS. 3, 5 and 7, each of the serrations 120 may define a serration width 122. Additionally, a serration length 124 may be defined for each serration 120. The length 124 may be measured between a base 126 and a tip 128 of the serration 120. As shown, the width 122 may change throughout the length 124 of the serration 120. Further, each of the serrations 120 may define a centerline 130. The centerline 130 may extend through the tip 128 of the serration 120, such as through the center of the tip 128, and through the base 126 of the serration 120, such as through the center of the base 126, and may generally bisect the serration 120.

It should be understood that, while exemplary embodiments of the serrations 120 are discussed below, a serration 120 according to the present disclosure may have any suitable characteristics, such as width 122, length 124, shape, or orientation, depending on the desired noise reduction characteristics for the noise reducer 110. Further, in exemplary embodiments, each individual serration 120 may have individual characteristics as required to achieve optimum noise reduction characteristics. In alternative embodiments, however, various groups of serrations 120 may have similar characteristics, or all serrations 120 may have similar characteristics, depending on the desired noise reduction characteristics for the noise reducer 110.

FIGS. 3 and 4 illustrate one embodiment of the noise reducer 110 of the present disclosure. In this embodiment, each of the noise reduction features 114 comprises a serration 120. Further, each of the reinforcing members 112 is a ridge 140. As shown, the ridge 140 extends outwardly with respect to the rotor blade 16, such as with respect to the trailing edge 28. The ridge 140 extends through at least a portion of the length 124 of the serration. Further, the ridge 140 generally disrupts the surface of the serration 120 and reinforces the serration throughout at least a portion of the length of the serration 120. In exemplary embodiments, the ridge 140 has a generally arcuate cross-sectional area. However, it should be understood that the present disclosure is not limited to generally arcuate ridges 140. Rather, any suitable ridge 140, such as a V-shaped ridge, a stepped ridge, or any other suitably shaped ridge, is within the scope and spirit of the present disclosure.

The ridge 140 may be, for example, heat formed into the serration 120, or the serration 120 may be injection molded with the ridge 140 included therein. Alternatively, the ridge 140 may be formed into the serration 120 utilizing any suitable technique. In exemplary embodiments, the ridge 140 and serration 120 are formed from the same material, and the ridge 140 and serration 120 are thus an integral unit. Alternatively, however, the ridge 140 and serration 120 may be formed from different materials, and may be attached to each other using any suitable attachment device or method, such as using an adhesive, a mechanical fastener, or any suitable bonding technique.

In exemplary embodiments, as shown, the ridge 140 may extend along the centerline 130 of the serration 120. For example, in some embodiments, the ridge 140 may extend along the centerline 130 from the base 126 to the tip 128, and may thus extend through the entire length 124 of the serration 120. Alternatively, the ridge 140 may extend through only a portion of the length 124, such as from the base 126 through a portion of the length 124 or through a portion of the length 124 to the tip 128. Further, in some alternative embodiments, the ridge 140 may be offset from the centerline 130 and/or may extend at an angle to the centerline 130.

The ridge 140 may cause the serration 120 to have a variable stiffness throughout at least a portion of the width 122 of the serration 120. For example, as discussed above, the ridge 140 may have a greater stiffness along the width 122 at locations proximate to the ridge 140, and may have a lesser stiffness along the width 122 at locations distant from the ridge 140. During operation of the rotor blade assembly 100, the serration 120 may thus have a variable flex throughout at least a portion of the width 122 when interacting with the wind flow. This variable flex due to the variable stiffness throughout at least a portion of the width 122 may improve the performance of the serration 120, and thus the noise reducer 110, in reducing the noise associated with the rotor blade 16.

Further, the ridge 140 itself may have a span-wise flex. During operation of the rotor blade assembly 100, the span-wise flex of the ridge 140 may further improve the performance of the serration 120, and thus the noise reducer 110, in reducing the noise associated with the rotor blade 16.

As shown in FIGS. 2 and 4, the noise reducer 110 in some embodiments may include a base plate 114, as discussed above. In some exemplary embodiments as shown, the base plate 114 is mounted to the pressure side 22 of the rotor blade 16 as shown. Further, the base plate 114 may, in some embodiments, have a generally curvilinear cross-section, as shown in FIG. 4. Thus, the base plate 114 may generally match the aerodynamic profile of the rotor blade 16, such as of the pressure side 22 as shown. Alternatively, however, the base plate 114 may have a generally linear cross-section, or may have any other suitable cross-section. Further, the reinforcing member 112, such as the ridge 140, and/or the noise reduction feature 116, such as the serration 120, may in some embodiments have a generally curvilinear cross-section, as shown in FIG. 4. Thus, the reinforcing member 112 and/or the noise reduction feature 116 may generally match the aerodynamic profile of the rotor blade 16, such as of the suction side 24 and/or the pressure side 22 as shown. Alternatively, however, the reinforcing member 112 and/or the noise reduction feature 116 may have a generally linear cross-section, or may have any other suitable cross-section.

FIGS. 5 through 8 illustrate alternative embodiments of the noise reducer 110 of the present disclosure. In these embodiments, each of the noise reduction features 114 comprises a serration 120. Further, each of the reinforcing members 112 is a spine member 150. As shown, the spine member 150 extends outwardly with respect to the rotor blade 16, such as with respect to the trailing edge 28. The spine member 150 extends through at least a portion of the length 124 of the serration. The spine member 150 generally reinforces the serration throughout at least a portion of the length of the serration 120. In exemplary embodiments, the spine member 150 has a generally oval or circular cross-sectional area. However, it should be understood that the present disclosure is not limited to generally oval or circular spine members 150. Rather, any suitable spine member, such as a rectangular or square spine member, a triangular spine member, or any suitable polygonal shaped spine member, is within the scope and spirit of the present disclosure.

Figure 6:
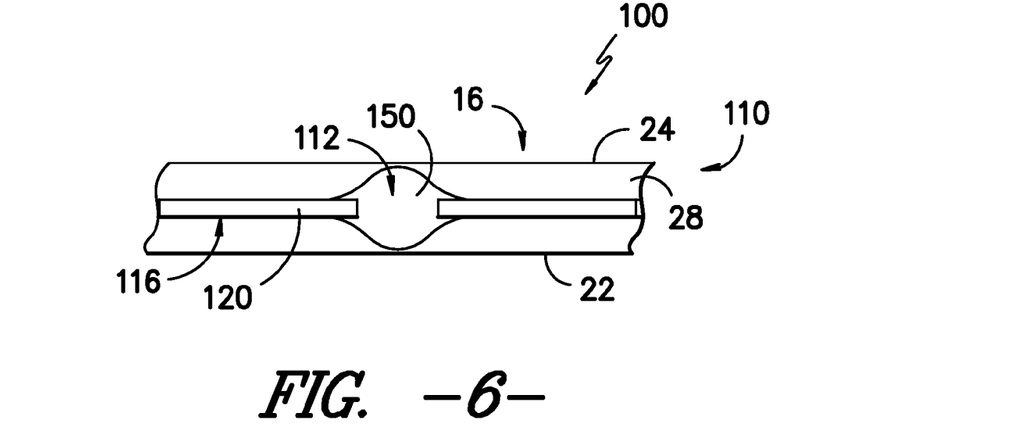
FIG. 6 is a cross-sectional view, through the lines 6-6 of FIG. 5, of one embodiment of a noise reducer of the present disclosure.
Figure 8:
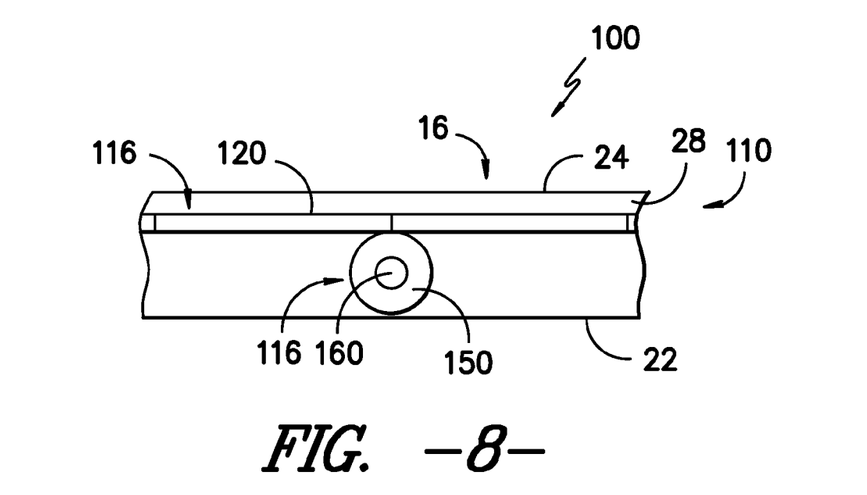
FIG. 8 is a cross-sectional view, through the lines 8-8 of FIG. 7, of one embodiment of a noise reducer of the present disclosure.

In some embodiments, as shown in FIGS. 5 and 6, the spine member 150 may encompass a portion of the serration 120. In these embodiments, the serration 120 may extend outwardly in the width-wise direction from generally opposing sides of the spine member 150 to define the width 122. The serration 120 may have a variable stiffness throughout those portions of the serration 120 exterior to the spine member 150, and thus through a portion of the width 122 of the serration 120. In other embodiments, as shown in FIGS. 7 and 8, the serration 120 may be mounted adjacent to the spine member 150. For example, as shown, the spine member 150 may be disposed adjacent the surface of the spine member 150 that is proximate the pressure side 22 of the rotor blade 16. Alternatively, the spine member 150 may be disposed adjacent the surface of the spine member 150 that is proximate the suction side 24. The serration 120 in these embodiments may have a variable stiffness throughout at least a portion of, or the entire, width 122 of the serration 120.

The spine member 150 may be, for example, heat formed into or onto the serration 120, or the serration 120 may be injection molded with the spine member 150 included therein or thereon. Alternatively, the spine member 150 may be formed into or adjacent to the serration 120 utilizing any suitable technique. In exemplary embodiments, the spine member 150 and serration 120 are formed from the same material, and the spine member 150 and serration 120 are thus an integral unit. Alternatively, however, the spine member 150 and serration 120 may be formed from different materials, and may be attached to each other using any suitable attachment device or method, such as using an adhesive, a mechanical fastener, or any suitable bonding technique.

In exemplary embodiments, as shown, the spine member 150 may extend along the centerline 130 of the serration 120. For example, in some embodiments, the spine member 150 may extend along the centerline 130 from the base 126 to the tip 128, and may thus extend through the entire length 124 of the serration 120. Alternatively, the spine member 150 may extend through only a portion of the length 124, such as from the base 126 through a portion of the length 124 or through a portion of the length 124 to the tip 128. Further, in some alternative embodiments, the spine member 150 may be offset from the centerline 130 and/or may extend at an angle to the centerline 130.

The spine member 150 may cause the serration 120 to have a variable stiffness throughout at least a portion of the width 122 of the serration 120. For example, as discussed above, the spine member 150 may have a greater stiffness along the width 122 at locations proximate to the spine member 150, and may have a lesser stiffness along the width 122 at locations distant from the spine member 150. During operation of the rotor blade assembly 100, the serration 120 may thus have a variable flex throughout at least a portion of the width 122 when interacting with the wind flow. This variable flex due to the variable stiffness throughout at least a portion of the width 122 may improve the performance of the serration 120, and thus the noise reducer 110, in reducing the noise associated with the rotor blade 16.

In some embodiments, as shown in FIG. 8, the noise reducer 110 may further include a plurality of auxiliary reinforcing members 160. Each of the plurality of auxiliary reinforcing members 160 may extend through at least a portion of one of the reinforcing members 112, such as through one of the spine members 150. For example, in exemplary embodiments, the auxiliary reinforcing member 160 may extend generally longitudinally through the reinforcing member 112. Further, the reinforcing member 112 may include one or more auxiliary reinforcing member 160 therein. The auxiliary reinforcing members 160 may provide stability to the reinforcing members 112, and may thus further stiffen the noise reduction features 116 proximate the reinforcing members 112. Further, in embodiments wherein the cross-section of the noise reduction feature 116, such as the serration 120, is generally curvilinear or otherwise bent, the auxiliary reinforcing member 160 may support the reinforcing member 112 and the noise reduction feature 116 while allowing for this bending.

In some embodiments, as shown in FIGS. 5 and 6, a reinforcing member 112 or reinforcing members 112 may taper to connect with the associated noise reduction feature 116 or features 116, such as with the associated serration 120 or serrations 120. For example, as shown, the cross-sectional profile of a reinforcing member 112 may include tapering portions which may extend from the reinforcing member 112 to the surface of the noise reduction feature 116. A tapered portion of the reinforcing member 112 may extend from any portion of the profile of the reinforcing member 112 to any surface of the noise reduction feature 116. The tapered portions may be curvilinear, as shown, or may be linear or have any other suitable configuration. Tapering the reinforcing member 112 may ease the transition between the reinforcing member 112 and the noise reduction feature 116, thus strengthening the reinforcing characteristics of the reinforcing member 112.

FIGS. 9 through 11 illustrate further alternative embodiments of the noise reducer 110 of the present disclosure. In these embodiments, each of the noise reduction features 116 comprises a plurality of bristles 220. Thus, the noise reducer 110 according to these embodiments includes a plurality of bristles 220, and at least a portion of the plurality of bristles 220 are connected to each of the plurality of reinforcing members 112. While in exemplary embodiments each plurality of bristles 220 connected to a reinforcing member 112 is arranged to be generally V-shaped, in alternative embodiments each plurality of the bristles 220 may be U-shaped, or may have any other shape or configuration suitable for reducing the noise being emitted from the rotor blade 16 during operation of the wind turbine 10. Further, as shown in FIG. 11, bristles 220 may be arranged about the reinforcing member 112 to form more than one V-shaped, U-shaped, or other shaped plurality of bristles 220 about the periphery of the reinforcing member 112.

As shown in FIGS. 9 and 11, each plurality of the bristles 220 connected to a reinforcing member 112 may define a bristle width 222. Additionally, a bristle length 224 may be defined for each plurality of bristles 220. The length 224 may be measured between a base 226 and a tip 228 of the plurality of bristles 220. As shown, the width 222 may change throughout the length 224 of the plurality of bristles 220. Further, each plurality of bristles 220 may define a centerline 230. The centerline 230 may extend through the tip 228 of the plurality of bristles 220, such as through the center of the tip 228, and through the base 226 of the plurality of bristles 220, such as through the center of the base 226, and may generally bisect the plurality of bristle 220.

It should be understood that, while exemplary embodiments of the bristles 220 are discussed below, each plurality of bristles 220 connected to a reinforcing member 112 according to the present disclosure may have any suitable characteristics, such as width 222, length 224, shape, or orientation, depending on the desired noise reduction characteristics for the noise reducer 110. Further, in exemplary embodiments, each plurality of bristles 220 may have individual characteristics as required to achieve optimum noise reduction characteristics. In alternative embodiments, however, various groups of plurality of bristles 220 may have similar characteristics, or all pluralities of bristles 220 may have similar characteristics, depending on the desired noise reduction characteristics for the noise reducer 110.

As shown in FIGS. 9 through 11, in some embodiments wherein each of the noise reduction features 114 comprises a plurality of bristles 220, each of the reinforcing members 112 is a spine member 250. As shown, the spine member 250 extends outwardly with respect to the rotor blade 16, such as with respect to the trailing edge 28. A portion of the plurality of bristles 220 extend from each spine member 250. Further, each bristle 220 may generally be mounted to the spine member 250. For example, the spine member 250 may encompass a portion of each bristle 220, such as an end of the bristle or a midpoint of the bristle. Thus, a bristle 220 may extend outwardly from the surface of the spine member 250, such as from the surface of the body of the spine member 250, or alternatively may extend through the spine member 250 and extend outwardly from generally opposing surfaces of the spine member 250. A bristle 220 extending through the spine member 250 and outwardly from generally opposing surfaces may thus define the width 222, or opposing bristles 220 each extending outwardly from opposing surfaces may define the width 222.

The bristles 220 may be injection molded with the spine member 250 included therein. Alternatively, the bristles 220 may be formed and placed into a mold, and the spine member 250 injection molded around the bristles 220. Alternatively, the spine member 250 and bristles 220 may be formed utilizing any suitable technique. In exemplary embodiments, the spine member 250 and bristles 220 are formed from the same material, and the spine member 250 and bristles 220 are thus an integral unit. Alternatively, however, the spine member 250 and bristles 220 may be formed from different materials, and may be attached to each other using any suitable attachment device or method, such as using an adhesive, a mechanical fastener, or any suitable bonding technique.

In exemplary embodiments, as shown, the spine member 250 may extend along the centerline 230 of the plurality of bristles 220 connected thereto. For example, in some embodiments, the spine member 250 may extend along the centerline 230 from the base 226 to the tip 228, and may thus extend through the entire length 224 of the plurality of bristles 220. Alternatively, the spine member 250 may extend through only a portion of the length 224, such as from the base 226 through a portion of the length 224 or through a portion of the length 224 to the tip 228. Further, in some alternative embodiments, the spine member 250 may be offset from the centerline 230 and/or may extend at an angle to the centerline 230.

The spine member 250 may further define a longitudinal axis 252. In exemplary embodiments, each of the plurality of bristles 220 may extend from a spine member 250 at an angle 254 in the range between approximately 5 degrees and approximately 90 degrees from the longitudinal axis 252 of the spine member 250.

As shown in FIG. 10, the reinforcing member 112, such as the spine member 250, and/or the noise reduction feature 116, such as the plurality of bristles 220, may in some embodiments have a generally curvilinear cross-section. Thus, the reinforcing member 112 and/or the noise reduction feature 116 may generally match the aerodynamic profile of the rotor blade 16, such as of the suction side 24 and/or the pressure side 22 as shown. Alternatively, however, the reinforcing member 112 and/or the noise reduction feature 116 may have a generally linear cross-section, or may have any other suitable cross-section.

The spine member 250 may cause the plurality of bristles 220 connected thereto to have a variable stiffness throughout at least a portion of the width 222 of the plurality of bristles 220. For example, as discussed above, the spine member 250 may have a greater stiffness along the width 222 at locations proximate to the spine member 250, and may have a lesser stiffness along the width 222 at locations distant from the spine member 250. During operation of the rotor blade assembly 100, the plurality of bristles 220 may thus have a variable flex throughout at least a portion of the width 222 when interacting with the wind flow. This variable flex due to the variable stiffness throughout at least a portion of the width 222 may improve the performance of the bristles 220, and thus the noise reducer 110, in reducing the noise associated with the rotor blade 16.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A rotor blade assembly for a wind turbine, comprising:
a rotor blade having surfaces defining a pressure side, a suction side, a leading edge, and a trailing edge extending between a tip and a root; and,
a noise reducer configured on a surface of the rotor blade, the noise reducer comprising a plurality of reinforcing members and a plurality of noise reduction features, each of the plurality of reinforcing members extending outwardly with respect to the rotor blade, each of the plurality of noise reduction features connected to one of the plurality of reinforcing members and defining a width, the width defined in a direction generally between the root and the tip, each of the plurality of reinforcing members causing the connected noise reduction feature to have a variable stiffness throughout at least a portion of a line in the direction of the width of the connected noise reduction feature.

2. The rotor blade assembly of claim 1, wherein at least a portion of the plurality of noise reduction features each comprises a serration.

3. The rotor blade assembly of claim 1, wherein at least a portion of the plurality of noise reduction features each comprises a plurality of bristles.

4. The rotor blade assembly of claim 3, wherein each of the plurality of bristles extends from the connected reinforcing member at an angle in the range between approximately 5 degrees and approximately 90 degrees from a longitudinal axis of the connected reinforcing member.

5. The rotor blade assembly of claim 1, wherein at least a portion of the plurality of reinforcing members each comprises a ridge.

6. The rotor blade assembly of claim 1, wherein at least a portion of the plurality of reinforcing members each comprises a spine member.

7. The rotor blade assembly of claim 1, wherein each of the plurality of reinforcing members extends along a centerline of the connected noise reduction feature.

8. The rotor blade assembly of claim 1, further comprising a plurality of auxiliary reinforcing members, each of the plurality of auxiliary reinforcing members extending through at least a portion of one of the plurality of reinforcing members.

9. The rotor blade assembly of claim 1, wherein each of the plurality of reinforcing members causes the connected noise reduction feature to have a variable stiffness throughout the entire width of the connected noise reduction feature.

10. A rotor blade assembly for a wind turbine, comprising:
a rotor blade having surfaces defining a pressure side, a suction side, a leading edge, and a trailing edge extending between a tip and a root; and,
a noise reducer configured on a surface of the rotor blade, the noise reducer comprising a plurality of serrations and a plurality of reinforcing members, each of the plurality of serrations defining a width and a length, the width defined in a direction generally between the root and the tip, each of the plurality of reinforcing members connected to one of the plurality of serrations and extending through at least a portion of the length of the serration, each of the plurality of reinforcing members causing the connected serration to have a variable stiffness throughout at least a portion of a line in the direction of the width of the connected serration.

11. The rotor blade assembly of claim 10, wherein at least a portion of the plurality of reinforcing members each comprises a ridge.

12. The rotor blade assembly of claim 10, wherein at least a portion of the plurality of reinforcing members each comprises a spine member.

13. The rotor blade assembly of claim 10, wherein each of the plurality of reinforcing members extends along a centerline of the connected serration.

14. The rotor blade assembly of claim 10, wherein each of the plurality of reinforcing members tapers to connect with each of the plurality of serrations.

15. The rotor blade assembly of claim 10, further comprising a plurality of auxiliary reinforcing members, each of the plurality of auxiliary reinforcing members extending through at least a portion of one of the plurality of reinforcing members.

16. A rotor blade assembly for a wind turbine, comprising:
a rotor blade having surfaces defining a pressure side, a suction side, a leading edge, and a trailing edge extending between a tip and a root; and,
a noise reducer configured on a surface of the rotor blade, the noise reducer comprising a plurality of reinforcing members and a plurality of bristles, the plurality of bristles defining at least one width in a direction generally between the root and the tip, each of the plurality of reinforcing members extending outwardly with respect to the rotor blade, at least a portion of the plurality of bristles connected to each of the plurality of reinforcing members, each of the plurality of reinforcing members causing the connected bristles to have a variable stiffness throughout at least a portion of a line in the direction of the width of the connected bristles.

17. The rotor blade assembly of claim 16, wherein each of the plurality of bristles extends from the connected reinforcing member at an angle in the range between approximately 5 degrees and approximately 90 degrees from a longitudinal axis of the connected reinforcing member.

18. The rotor blade assembly of claim 16, wherein at least a portion of the plurality of reinforcing members each comprises a spine member.

19. The rotor blade assembly of claim 16, wherein each of the plurality of reinforcing members extends along a centerline of the connected portion of the plurality of bristles.

20. The rotor blade assembly of claim 16, further comprising a plurality of auxiliary reinforcing members, each of the plurality of auxiliary reinforcing members extending through at least a portion of one of the plurality of reinforcing members.

* * * * *